No. 790,085.

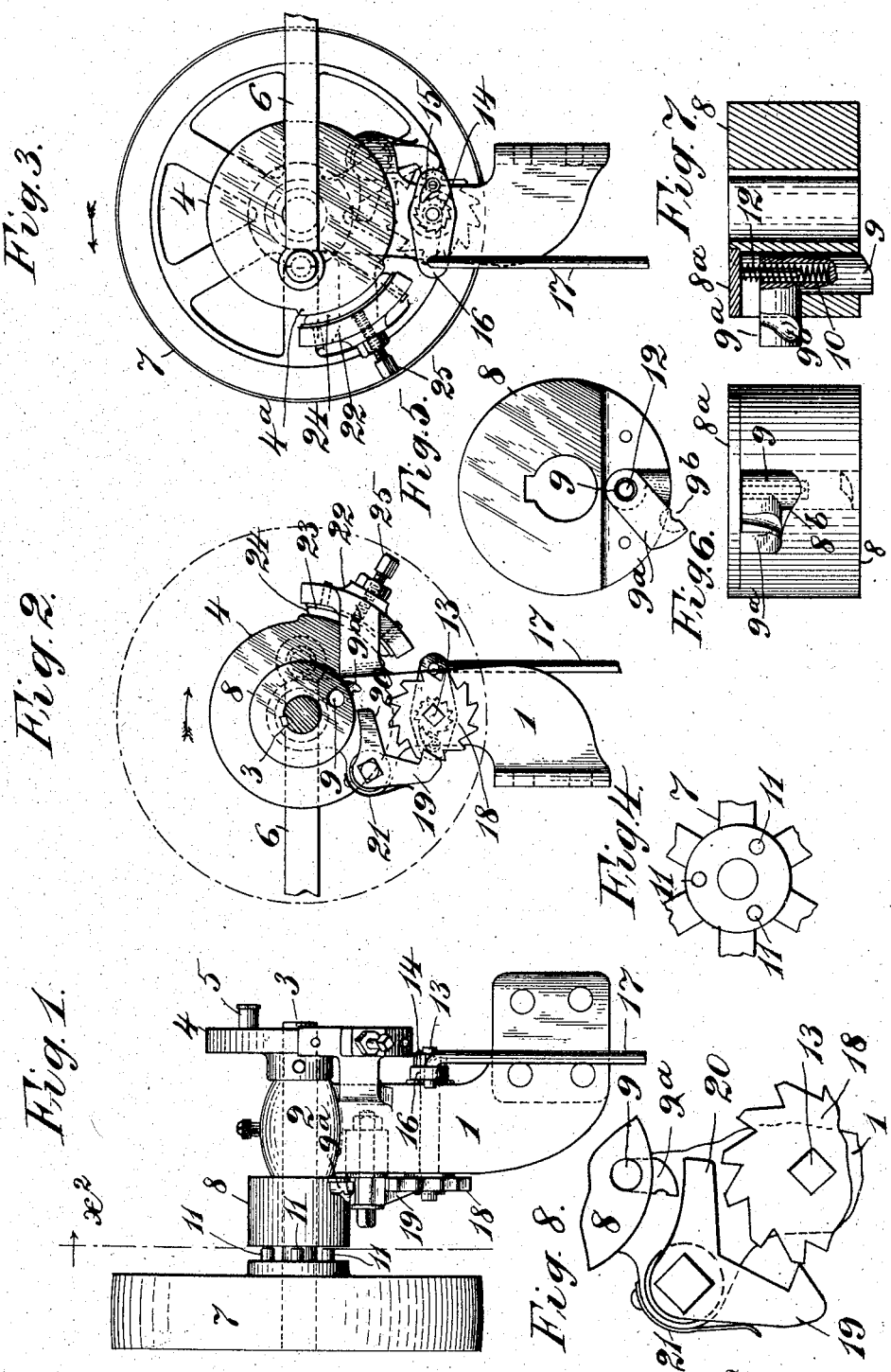

Patented May 16, 1905.

UNITED STATES PATENT OFFICE.

EDWIN BALL STIMPSON, OF NEW YORK, N. Y.

AUTOMATIC CLUTCH.

SPECIFICATION forming part of Letters Patent No. 790,085, dated May 16, 1905.

Application filed July 1, 1904. Serial No. 214,936.

*To all whom it may concern:*

Be it known that I, EDWIN BALL STIMPSON, a citizen of the United States, residing in the borough of Brooklyn, in the county of Kings, in the city and State of New York, have invented certain new and useful Improvements in Automatic Clutches, of which the following is a specification.

This invention relates to a type of clutch which when put into engagement couples a machine to the driving-shaft during one rotation of the shaft or one operation of the machine and then automatically disengages. Thus the attendant of such a machine may, when he is ready, depress a treadle and set the machine in motion, and when the latter has completed an operation it will stop of itself.

The object of the present invention is to provide a simple and efficient means for effecting the above object and also to provide an adjustable brake which insures the machine being arrested at exactly the desired point.

Another feature is a means whereby the attendant may, if he desires, so set the escapement device, through the medium of the operating-rod or treadle-rod, as to permit the machine to make more than one operation before it stops.

In the accompanying drawings, which illustrate an embodiment of the invention, Figure 1 is a rear elevation of the mechanism wherein the invention is embodied. Fig. 2 is a sectional elevation seen from the left in Fig. 1. The plane of the section is indicated by the line $x^2$ in Fig. 1. Fig. 3 is an elevation of the right-hand side of the device as the latter is seen in Fig. 1. Fig. 4 is a face view of the boss of the driving-pulley, showing the clutch-pins therein. Figs. 5, 6, and 7 are detail views, on a larger scale than the principal views, showing the clutch-boss on the shaft. Fig. 8 is an enlarged view of the escapement device, illustrating the manner of setting the rocker so as to permit the machine to make more than one operation.

In the drawings only those parts of a machine which embody the invention are shown, as these are all that are required to a full understanding thereof. The work to be done by the machine is not important, nor the means by which the attendant sets the machine in motion. It may be assumed that the machine is a button-setting or eyelet-setting machine of a known kind and that the attendant sets the machine in motion through the medium of a treadle and treadle-rod.

1 designates a bracket to be secured to the frame of the machine, and 2 designates a bearing therein for the machine driving-shaft 3. On this shaft is secured a crank-disk 4, provided with a crank-pin 5, to which is coupled an operating-rod 6, to be reciprocated by the crank and to impart the necessary movements to the parts of the machine not shown. At each rotation of the shaft 3 the machine completes one operation.

Loose on the shaft 3 is a driving wheel or pulley 7, which will be driven continuously by a belt, for example. If this continuously-rotating pulley be clutched to the shaft, it will drive the latter until the clutch shall be disengaged. The drawings show mechanism for effecting this engagement and disengagement of the pulley, and this mechanism will now be described. On the shaft is keyed a clutch-boss 8, which has mounted in it a sliding clutch-bolt 9, the end of which is normally protruded from the end or face of the boss (adjacent to the pulley-boss) by a spring 10 (seen in the sectional detail view, Fig. 7) and into the path of one of a plurality of clutch-pins 11 in the face of the pulley-boss. These pins are seen in Figs. 1 and 4. It may be explained here, with reference to Figs. 5, 6, and 7, that the spring 10 enters a hollow or bore in the bolt 9 and is held in position by a pin 12 on a plate $8^a$, secured to and forming a part of the boss 8. By means of this plate the bolt is retained after being inserted into its slide-way in the boss. On the bolt is an operating-arm $9^a$, which projects out laterally through an aperture in the boss and bears on an oblique camway $8^b$, forming one side of said aperture. Figs. 5 and 6 show the bolt withdrawn, when the spring 10 will be of course compressed and under tension, and Fig. 7 shows the bolt protruded by the spring.

In the bracket, below the main shaft, is rotatively mounted a shaft 13, which may be called the "escapement-shaft," and on the end of this shaft, which is at the right in Fig. 1, is secured a ratchet-wheel 14, Fig. 3, engaged by a spring-pawl 15, carried on one arm of a pawl-lever 16, which rocks on the shaft 13. To the other arm of this lever is coupled an operating-rod 17, which can be drawn down by the attendant in any way desired; but it will usually be coupled to a treadle and will be driven upward by the spring which elevates the treadle. These features are not shown herein, as a treadle, treadle-rod, and spring are common in machines of this type and their operation is well understood. Moreover, it is not essential to this invention that the pawl 15 shall be operated by a treadle and rod in order to transmit intermittent rotary motion to the ratchet-wheel 14.

On the shaft 13, and as here shown at the left in Fig. 1, is secured an escapement-wheel 18, somewhat in the form of a ratchet-wheel, Figs. 2 and 8, and mounted to rock on a bearing on the bracket 1 is a rocker comprising a pawl 19, which engages the teeth of the escapement-wheel 18, and a detent-arm 20, which occupies normally a position in the path of the operating-arm $9^a$ of the bolt 9. The rocker has a spring 21, Fig. 2, which holds its arm 19 in engagement yieldingly with the escapement-wheel.

When the machine is at rest and the pulley 7 running, the bolt 9 will be drawn back, as in Fig. 6, by pressure of its arm $9^a$ against the detent-arm 20 of the rocker.

To set the machine in motion, the attendant, through a treadle, for example, draws down the rod 17, thus causing the pawl 15, by engagement with the ratchet-wheel 14, to rotate the escapement-shaft 13. The effect of this is to rotate the escapement-wheel 18 and cause it to turn the rocker about its pivot by a tooth acting upon the pawl 19, thus depressing or moving the detent-arm 20 out of the path of the arm $9^a$ and allowing the spring 10 to protrude the bolt 9 into the path of the pins 11 on the boss of the pulley. A pin 11 instantly engages the bolt 9 and sets the shaft 3 in motion. In the meantime, however, the tooth of the escapement-wheel will have passed the pawl 19 of the rocker and will have allowed the nose on said pawl to engage the next notch in the escapement-wheel, thereby again setting the detent-arm 20 into the path of the arm $9^a$ on the bolt. When the arm $9^a$ again comes around, it impinges on the arm 20, and the effect is to withdraw the bolt 9 by imparting to the latter a spiral rotation—that is to say, the bolt has imparted to it a movement about its axis and the camway $9^b$ acts on the arm $9^a$ in such a manner as to draw the bolt in or back. The purpose of this camway is to enable the force applied in a direction at right angles to the axis of the bolt to move the latter longitudinally to a moderate extent.

The withdrawal of the bolt 9 disengages the clutch and the machine stops; but in order to prevent the momentum of the parts from carrying the shaft beyond the precise point desired or beyond the starting-point a brake is provided, which will now be described with especial reference to Figs. 2 and 3.

Mounted on the bracket in the desired position is a brake-holder 22, carrying a curved metal plate 23, to which is secured a brake-shoe 24, of leather or other suitable soft material, placed in position to bear upon a raised brake-surface $4^a$ on the rim of the crank disk or wheel 4. This brake is so placed that when the shaft 3 has completed one revolution it will come in play to overcome any momentum of the parts and instantly arrest the rotation. A set-screw 25 in the holder 22 and bearing upon the shoe-carrying plate 23 will regulate the braking friction as desired. The surface $4^a$ is raised in order that the machine shall be free from brake friction except at one point in the rotation.

Obviously the pulley 7 may as well be a gear-wheel; but a pulley is ordinarily employed for driving machines of this class. Obviously also the entire device may be mounted on the machine-frame in the position best suited for the purpose intended.

In order that the attendant may for any reason wish to permit the machine to make two or more consecutive operations before it stops, he may do so by so depressing the treadle that the nose of the pawl 19 of the rocker shall rest on the flat end of a tooth of the escapement-wheel 18, and thus hold the detent-arm 20 out of the path of the arm on the bolt 9. This is illustrated in Fig. 8.

Fig. 3 shows the rod 6 on the center at the starting and stopping point; but this is not important so far as the present invention is concerned. Fig. 2 shows the position of the parts at a moment before the arm $9^a$ impinges on the detent-arm 20 and disengages the clutch.

The clutch-boss 8 is herein shown as separable from the shaft 3 and adapted to be keyed thereon; but this is not essential to the invention. Obviously it might be integral with the shaft.

The clutch-pins 11 may be any sort or kind of projections. The arm $9^a$ may have in it a recess $9^b$ to engage the detent-arm 20 and prevent it from slipping too easily in the operation. The escapement-wheel 18 may be considered as a cam-wheel for imparting an oscillatory movement to the rocker, and the arm 19 of the latter may have any suitable form. As shown, it performs the functions of a spring detent-pawl to hold the shaft 13 steady.

The brake illustrated in the drawings and described in the specification does not form an essential part of the present invention and is not herein claimed. Some brake for effecting the object is, however, desirable.

Having thus described my invention, I claim—

1. The combination with a rotatively-mounted shaft, and a rotatable driving-wheel thereon having a clutch-pin, of a slidable and rotatably-mounted bolt carried around by the shaft, a spring which normally protrudes said bolt into the path of said clutch-pin, a cam which withdraws said bolt when the latter is partially rotated, a detent normally disposed to partially rotate said bolt and thus withdraw the latter at each revolution of the shaft, and means for shifting said detent to permit the clutch members to engage.

2. The combination with a rotatably-mounted shaft, and a rotatable driving-wheel loose on said shaft and having clutch-pins, of an automatic device for clutching the shaft to the said driving-wheel, said device comprising a slidable bolt carried around by the shaft, a spring which tends to protrude said bolt into the path of the clutch-pins, an operating-arm on said bolt for withdrawing it, a rocker pivotally mounted adjacent to said shaft and having a detent-arm normally in the path of the operating-arm on the bolt, a rotatively-mounted, toothed escapement-wheel, the teeth of which are engaged by a pawl-arm on the rocker, the said pawl-arm, the spring of said rocker, and means for imparting an intermittent rotary movement to the escapement-wheel for operating the rocker.

3. The combination with a rotatably-mounted shaft, and a rotatably-mounted driving-wheel loose on said shaft and provided with clutch-pins, of an automatic clutch mechanism comprising a boss on and rotating with said shaft adjacent to the clutch-pins in the wheel, a bolt 9, mounted slidably in the boss and provided with a laterally-projecting arm 9ª, a spring which tends normally to protrude said bolt into its engaging position with the clutch-pins, means on the boss which moves the bolt endwise when it is rotated, a shaft 13, an escapement-wheel 18 on said shaft, a rocker provided with a spring, said rocker having a pawl-arm 19 held in engagement with the escapement-wheel by said spring and a detent-arm 20, held in the path of the arm 19ª by said spring, and means for imparting intermittent rotation to said escapement-wheel to operate said rocker.

4. The combination with a rotatably-mounted shaft, and a rotatably-mounted driving-wheel loose on said shaft and provided with clutch-pins, of an automatic clutch mechanism comprising a boss on and rotating with said shaft adjacent to the clutch-pins in the wheel, a bolt 9, mounted slidably in the boss and provided with a laterally-projecting arm 9ª, a spring which tends normally to protrude said bolt into its engaging position with the clutch-pins, means on the boss which moves the bolt endwise when it is rotated, a shaft 13, an escapement-wheel 18 on said shaft, a rocker provided with a spring, said rocker having a pawl-arm 19 held in engagement with the escapement-wheel by said spring and a detent-arm 20, held in the path of the arm 19ª by said spring, a ratchet-wheel 14 on the shaft 13, a rocking lever 16 on said shaft, a pawl 15 on said lever and engaging the ratchet-wheel, and a rod 17 coupled to said lever for rocking it.

5. The combination, with the shaft 3, and a driving-wheel thereon provided with clutch-pins 11, of the boss 8 on the shaft, a spring-bolt 9 slidable in a socket in said boss and provided with a lateral arm 9ª projecting laterally through an aperture in said boss, a cam 8ᵇ on the boss, a movable detent held by a spring in the path of said arm 9ª for withdrawing the bolt 9, and means for moving the said detent out of the path of said arm.

6. In a clutch device, the combination with the driven clutch member, of the boss 8, having in it a bolt-socket, a lateral opening into said socket, a cam 8ᵇ at the margin of said opening, a removable plate 8ª closing the rear or inner end of the socket, and a pin 12 on said plate; a tubular bolt 9 rotatable and slidable in said socket, a spring 10 on said pin and engaging the socket in the bolt, and an arm 9ª on the bolt and protruding from the aperture in the boss.

7. In a clutch device, the spring-rocker having a detent-arm 20 and pawl-arm 19, the escapement-shaft, the escapement-wheel 18 thereon, having teeth with broad tips on which the pawl of the rocker may rest, and means for imparting intermittent rotation to said wheel.

In witness whereof I have hereunto signed my name, this 29th day of June, 1904, in the presence of two subscribing witnesses,

EDWIN BALL STIMPSON.

Witnesses:
HENRY CONNETT,
WILLIAM J. FIRTH.